United States Patent
Roskind

(10) Patent No.: US 9,432,338 B2
(45) Date of Patent: Aug. 30, 2016

(54) SECURE COMMUNICATIONS USING ADAPTIVE DATA COMPRESSION

(71) Applicant: Google Inc., Mountain View, CA (US)

(72) Inventor: James Anthony Roskind, Redwood City, CA (US)

(73) Assignee: Google Inc., Mountain View, CA (US)

( * ) Notice: Subject to any disclaimer, the term of this patent is extended or adjusted under 35 U.S.C. 154(b) by 133 days.

(21) Appl. No.: 14/061,688

(22) Filed: Oct. 23, 2013

(65) Prior Publication Data

US 2015/0110131 A1    Apr. 23, 2015

(51) Int. Cl.
*H04L 29/06* (2006.01)
*H04L 12/811* (2013.01)

(52) U.S. Cl.
CPC .......... *H04L 63/0428* (2013.01); *H04L 47/38* (2013.01); *H04L 63/1441* (2013.01); *H04L 69/04* (2013.01)

(58) Field of Classification Search
CPC ..... H04L 65/607; H04L 69/04; H04L 47/10; H04L 65/80; H04L 43/0864; H04L 47/11; H04L 47/27; H04L 47/38
See application file for complete search history.

(56) References Cited

U.S. PATENT DOCUMENTS

| | | | |
|---|---|---|---|
| 7,386,046 B2* | 6/2008 | Fallon et al. | 375/240 |
| 7,420,992 B1* | 9/2008 | Fang et al. | 370/477 |
| 7,460,032 B2* | 12/2008 | Boldt et al. | 341/50 |
| 7,714,747 B2* | 5/2010 | Fallon | 341/51 |
| 7,777,651 B2* | 8/2010 | Fallon et al. | 341/51 |
| 7,796,517 B2* | 9/2010 | Chen et al. | 370/235 |
| 8,010,668 B1* | 8/2011 | Rothstein et al. | 709/224 |
| 8,275,897 B2* | 9/2012 | Fallon | 709/231 |
| 8,340,654 B2* | 12/2012 | Bratton et al. | 455/420 |
| 8,369,324 B1* | 2/2013 | Breight et al. | 370/389 |
| 8,417,833 B1* | 4/2013 | Amdahl | 709/247 |
| 8,526,465 B1* | 9/2013 | Masterson et al. | 370/465 |
| 8,694,684 B2* | 4/2014 | Verzunov et al. | 709/247 |
| 8,742,958 B2* | 6/2014 | Fallon et al. | 341/51 |
| 8,750,383 B2* | 6/2014 | Milstein | 375/240.19 |
| 2003/0046704 A1* | 3/2003 | Laksono et al. | 725/96 |
| 2004/0083361 A1* | 4/2004 | Noble et al. | 713/160 |
| 2005/0180568 A1* | 8/2005 | Krause | H04N 21/23608 380/212 |
| 2005/0234927 A1* | 10/2005 | Bande | G06F 17/30575 |
| 2005/0254420 A1* | 11/2005 | Wager et al. | 370/230 |
| 2006/0064749 A1* | 3/2006 | Aaron et al. | 726/13 |
| 2007/0096954 A1* | 5/2007 | Boldt | H03M 7/30 341/50 |

(Continued)

FOREIGN PATENT DOCUMENTS

WO    WO-98/28891 A1    7/1998
WO    WO-2007/050740 A2    5/2007

*Primary Examiner* — Derrick Ferris
*Assistant Examiner* — Jay Vogel
(74) *Attorney, Agent, or Firm* — McDermott Will & Emery LLP

(57) ABSTRACT

Aspects of the subject technology relate to systems, methods, and machine-readable media for communicating using adaptive data compression. A system is configured to compare operation of an encrypted communications channel to at least one operational threshold for the encrypted communications channel and select a level of compression for the encrypted communications channel based on the comparing. The system is further configured to compress data packets to be transmitted over the encrypted communications channel in accordance with the level of compression, encrypt the data packets, and transmit, via a network, the encrypted and compressed data packets to a destination.

17 Claims, 3 Drawing Sheets

(56) References Cited

U.S. PATENT DOCUMENTS

| | | | |
|---|---|---|---|
| 2007/0183493 A1* | 8/2007 | Kimpe | 375/240.1 |
| 2008/0172525 A1* | 7/2008 | Nakamura et al. | 711/113 |
| 2008/0224906 A1* | 9/2008 | Plamondon | H03M 7/30 341/76 |
| 2008/0228933 A1* | 9/2008 | Plamondon | 709/230 |
| 2009/0037606 A1* | 2/2009 | Diab | 709/247 |
| 2009/0041042 A1* | 2/2009 | Diab | 370/401 |
| 2009/0113204 A1* | 4/2009 | Raniere | 713/153 |
| 2009/0161547 A1* | 6/2009 | Riddle et al. | 370/236 |
| 2010/0077141 A1* | 3/2010 | Achler | H03M 7/3088 711/108 |
| 2010/0121972 A1* | 5/2010 | Samuels | H04L 41/082 709/231 |
| 2010/0257572 A1* | 10/2010 | Sridhar | H04L 12/1822 725/116 |
| 2011/0030025 A1* | 2/2011 | Bertonis et al. | 725/118 |
| 2011/0039506 A1* | 2/2011 | Lindahl et al. | 455/130 |
| 2011/0122786 A1* | 5/2011 | Koo et al. | 370/252 |
| 2011/0170477 A1* | 7/2011 | Cao et al. | 370/328 |
| 2012/0288088 A1* | 11/2012 | Chang et al. | 380/28 |
| 2012/0327779 A1* | 12/2012 | Gell et al. | 370/238 |
| 2013/0077486 A1* | 3/2013 | Keith | 370/230.1 |
| 2013/0145047 A1* | 6/2013 | Short et al. | 709/247 |
| 2013/0243075 A1* | 9/2013 | Dalela et al. | 375/240.01 |
| 2013/0275578 A1* | 10/2013 | Williams et al. | 709/224 |
| 2013/0314496 A1* | 11/2013 | Rossato et al. | 348/43 |
| 2013/0343528 A1* | 12/2013 | Polland | H04M 11/062 379/93.06 |
| 2014/0115128 A1* | 4/2014 | Myrberg et al. | 709/221 |
| 2014/0173111 A1* | 6/2014 | Varner | 709/225 |
| 2014/0187239 A1* | 7/2014 | Friend et al. | 455/426.1 |
| 2014/0195798 A1* | 7/2014 | Brugger et al. | 713/154 |
| 2014/0226711 A1* | 8/2014 | Ramamoorthy et al. | 375/240.02 |
| 2014/0247318 A1* | 9/2014 | Tucker et al. | 348/14.05 |
| 2014/0337473 A1* | 11/2014 | Frusina et al. | 709/217 |
| 2015/0031350 A1* | 1/2015 | Haggett | H04W 4/001 455/419 |
| 2015/0043554 A1* | 2/2015 | Meylan et al. | 370/338 |
| 2015/0067819 A1* | 3/2015 | Shribman et al. | 726/12 |
| 2015/0078162 A1* | 3/2015 | Prakash et al. | 370/235 |
| 2015/0086013 A1* | 3/2015 | Metzler et al. | 380/210 |

* cited by examiner

SECURE COMMUNICATIONS USING ADAPTIVE DATA COMPRESSION

BACKGROUND

The present disclosure generally relates to secure communications over a network, in particular, to secure communication using a cryptographic protocol.

Data is commonly transmitted over a network or a combination of networks (e.g., the Internet). In many cases, to reduce the amount of computing resources (e.g., bandwidth or storage space) used, before data is transmitted over the network, the data may be compressed or encoded to use fewer bits than the original data. Some compression encodings used may include, for example, the Huffman encoding or the Lempel-Ziv-Welch (LZW) encoding.

The compressed data may be transmitted from the source to the destination using various communication protocols. Some of these communication protocols are cryptographic protocols designed to provide communication security over the network. Cryptographic protocols, such as the secure sockets layer (SSL) protocol or the transport layer security (TLS) protocol, may encrypt the data before the data is transmitted to the destination.

SUMMARY

According to one aspect of the subject technology, a system for communicating using adaptive data compression is provided. The system includes one or more processors and a machine-readable medium comprising instructions stored therein, which when executed by the one or more processors, cause the one or more processors to perform operations. The operations include determining whether an encrypted communications channel is operating above an operational threshold for the encrypted communications channel and modifying a level of compression for the encrypted communications channel based on the determining. The operations further comprise compressing, in accordance with the modified level of compression, data packets to be transmitted over the encrypted communications channel, encrypting the data packets, and transmitting, via a network, the encrypted and compressed data packets to a destination.

According to another aspect of the subject technology, a method for communicating using adaptive data compression is provided. The method includes determining whether an encrypted communications channel is operating above an operational threshold for the encrypted communications channel, wherein the encrypted communications channel is operating based on a level of compression and increasing the level of compression for the encrypted communications channel when the encrypted communications channel is operating above the operational threshold. The operations further include compressing, in accordance with the increased level of compression, data packets to be transmitted over the encrypted communications channel, encrypting the data packets, and transmitting, over the encrypted communications channel, the encrypted and compressed data packets to a destination.

Another aspect of the subject technology relates to a machine-readable medium including instructions stored therein, which when executed by a machine, cause the machine to perform operations. The operations include comparing operation of an encrypted communications channel to at least one operational threshold for the encrypted communications channel and selecting a level of compression for the encrypted communications channel based on the comparing. The operations further include compressing, in accordance with the level of compression, data packets to be transmitted over the encrypted communications channel, encrypting the data packets, and transmitting, via a network, the encrypted and compressed data packets to a destination.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding of the subject technology and are incorporated in and constitute a part of this specification, illustrate disclosed aspects of the subject technology and together with the description serve to explain the principles of the subject technology.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

When data is transmitted over the Internet, in many cases, the data is encrypted in order to protect the contents of the data and/or the privacy of the sender or receiver of the data. The data to be transmitted may also be compressed in order to reduce the amount of computing resources used to transmit the data. However, transmissions such as these may still be susceptible to certain types of attacks, for example, wherein the volume or sizes of transmissions is monitored by other parties, and senders or receivers of the data may be unaware that their transmissions are being monitored by these potentially unknown parties.

Various aspects of the subject technology relate to providing additional security measures to help protect the integrity of data transmitted between parties. Some aspects provide additional security by using adaptive data compression. For example, a system may be configured to compare the operation of an encrypted communications channel to one or more operational thresholds for the encrypted communications channel and select a level of compression for the encrypted communications channel based on whether the operation of the encrypted communications channels exceeds one or more of those operational thresholds. The system may then compress data to be transmitted in accordance with the level of compression, encrypting the data to be transmitted, and transmit the encrypted and compressed data to a destination.

Figure 1:
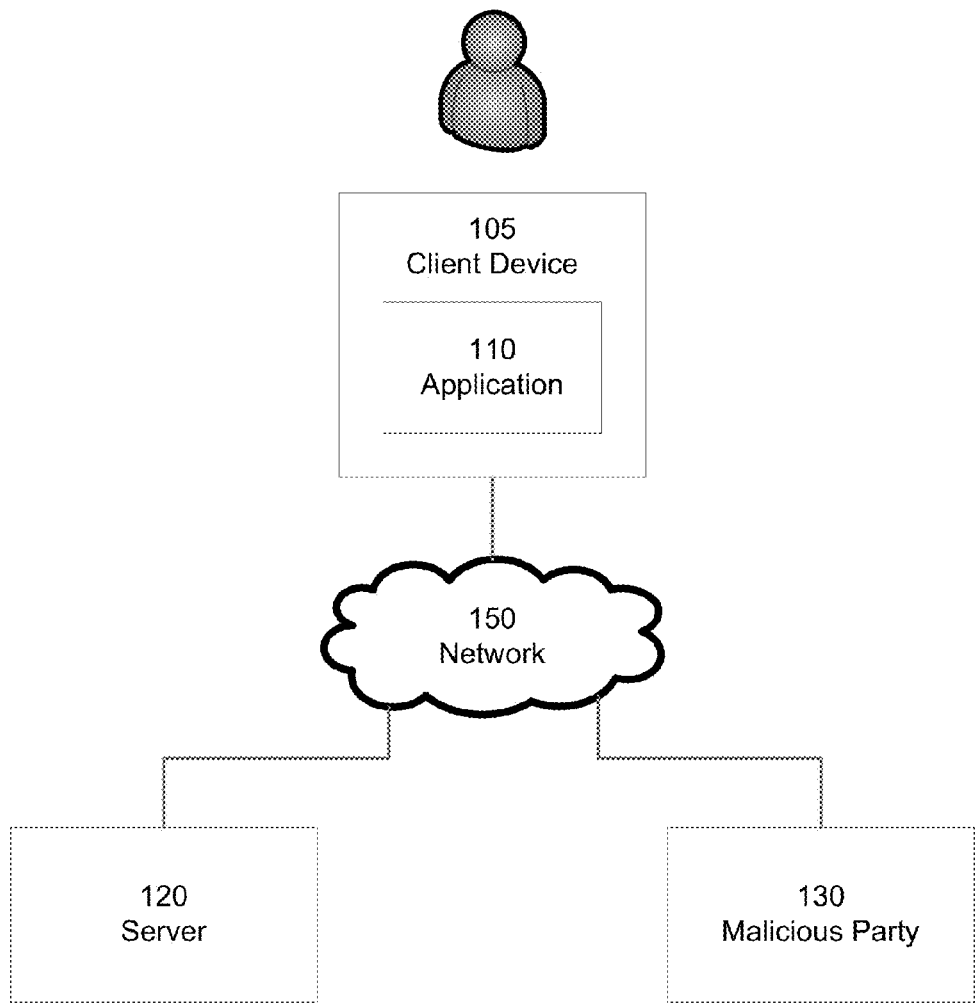
FIG. 1 is a block diagram illustrating an example network environment for providing communications through adaptive data compression, in accordance with various aspects of the subject technology.

Various aspects of the subject technology relate to systems and methods for communicating using adaptive data compression. FIG. 1 is a block diagram illustrating an example network environment 100 for providing communications through adaptive data compression, in accordance with various aspects of the subject technology. Although FIG. 1 illustrates a client-server network environment 100, other aspects of the subject technology may include other configurations including, for example, peer-to-peer environments. The network environment includes multiple computing machines (e.g., client devices 105, servers 120, etc.) that are configured to be able to communicate with another computing machine over a network 150 (e.g., the Internet).

The network 150 may include, for example, any one or more of a cellular network, a satellite network, a personal area network (PAN), a local area network (LAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

The computing machines in the network environment 100 may include one or more client devices 105, one or more servers 120, and possibly malicious parties 130 that seek to compromise communications between the other computing machines in the network environment 100. The client device 105 may be any machine capable of communicating with the servers 120 and 130 via the network 150. For example, client device 105 may be a desktop computer, a laptop, a mobile device (e.g., a smart phone, tablet, personal digital assistant (PDA), a global positioning system (GPS) device, etc.), a set top box or smart display, or any other machine with a processor, memory, and communications capabilities.

Each client device 105 may also include one or more applications 110 (e.g., a web browser, an email application, or other application) that may be configured to perform tasks, load content, or provide other services to the user. The applications may be used in conjunction with a variety of services provided over the network such as providing online content (e.g., web pages or streaming media), cloud computing services, email services, file hosting services, social networking services, etc. In many cases, the applications 110 may be configured to communicate with one or more servers 120 or client devices 105 in the network environment 100 in order to provide the services to the user.

The bandwidth and other computing resources (storage space, processing power, etc.) available on the network 150 or in portions of the network 150 may be limited. Accordingly, in order to reduce the amount of computing resources used, before data is transmitted over the network, the data may be compressed or encoded to use fewer bits than the original data. Some compression encodings used may include, for example, the Huffman encoding or the Lempel-Ziv-Welch (LZW) encoding. In order to protect the data transmitted in communications between computing machines in the network environment 100, each computing machine may be configured to encrypt the data using one or more encryption protocols or cryptographic protocols. These protocols may include, for example, the secure sockets layer (SSL) protocol or the transport layer security (TLS) protocol.

According to some scenarios, data to be transmitted over a network by a source machine may be processed using a compression encoding in order to reduce its size. After the data is reduced in size, the compressed data may be encrypted using one or more cryptographic protocols. After the compressed data is encrypted, the encrypted and compressed data may be transmitted to a destination machine.

In many cases, the cryptographic protocols may not adequately ensure the security of the information being transmitted. For example, the Compression Ratio Info-leak Made Easy (CRIME) security exploit involves a malicious party 130 being able to observe the size of the encrypted data (e.g., cyphertext) sent by a source computing device over the network and at the same time inducing the source computing device (e.g., a web browser or other application on the source computing device) to make multiple carefully crafted communications to a target site.

The malicious party 130 then observes the sizes of a series of compressed (and encrypted) communications transmitted to the target site. The compressed communications each contain both a secret content (e.g., a cookie) that is sent by the source computing machine to the target site and variable content created by the malicious party 130. As the variable content is altered by the malicious party 130, the size of the compressed communications may change. When the size of the compressed content is reduced, the malicious party 130 may infer that it is probable that some part of the variable content injected by the malicious party 130 matches some part of the secret content that the malicious party 130 wishes to discover. The malicious party 130 may then use additional techniques to hone in on the secret content using a relatively small number of probe attempts. Although these attacks may be prevented by not compressing the encrypted information, not compressing the data communicated over the network leads to additional computing resources (e.g., bandwidth or storage space) being used, which may lead to increased latency.

Various aspects of the subject technology relate to providing increased security in data communications while still providing some benefits of data compression. For example, a system implemented on a computing machine in the network environment 100 may be configured to transmit data packets using an encrypted communications channel in accordance with a particular level of compression. The system may compare the current operation of the communications channel at the current level of compression with a threshold capacity for the channel.

Based on the comparison, the system may set or modify the level of compression. For example, the system may set the level of compression of data packets to be transmitted over the communications channel such that the communications channel will operate as close to the threshold capacity without exceeding the threshold capacity. In one implementation, the system may determine whether the encrypted communications channel is operating above the threshold capacity. If the communications channel is operating above the threshold capacity, the system may increase the level of compression for data packets to be sent over the communications channel. One example of "increasing the level" of compression is to use the maximum available compression for some extent of time or data. If the communications channel is operating below the threshold capacity, the system may decrease the level of compression for data packets to be sent over the communications channel. One example of "decreasing the level of compression" is to completely disable compression for some extent of time or data.

After the level of compression is set, the system may compress data packets to be transmitted over the communications channel in accordance with the modified level of compression, encrypt the compressed data packets, and transmit the encrypted and compressed data packets to their respective destinations using the encrypted communications channel.

By varying the amount that data packets transmitted over a communications channel through variation in the resulting compression ratio, the system may thwart a malicious party. For example, when the communications channel is operating below capacity, the level of compression will be decreased or temporarily eliminated and when there is no compression, the malicious party will not see any difference in size in the data packets being transmitted over the communications channel. Furthermore, because the communications channel is operating below capacity, there is available bandwidth to transmit the uncompressed data and no threat of latency.

When the channel is operating at or near capacity, it will be more difficult for the malicious party to determine which data packets being sent over the channel correspond to the communication that the malicious party induced the computing device to transmit. If the communications channel is operating above its threshold capacity, the system may increase the level of compression so that that data may be sent over the communications channel using the available bandwidth and without incurring additional latency.

Figure 2:
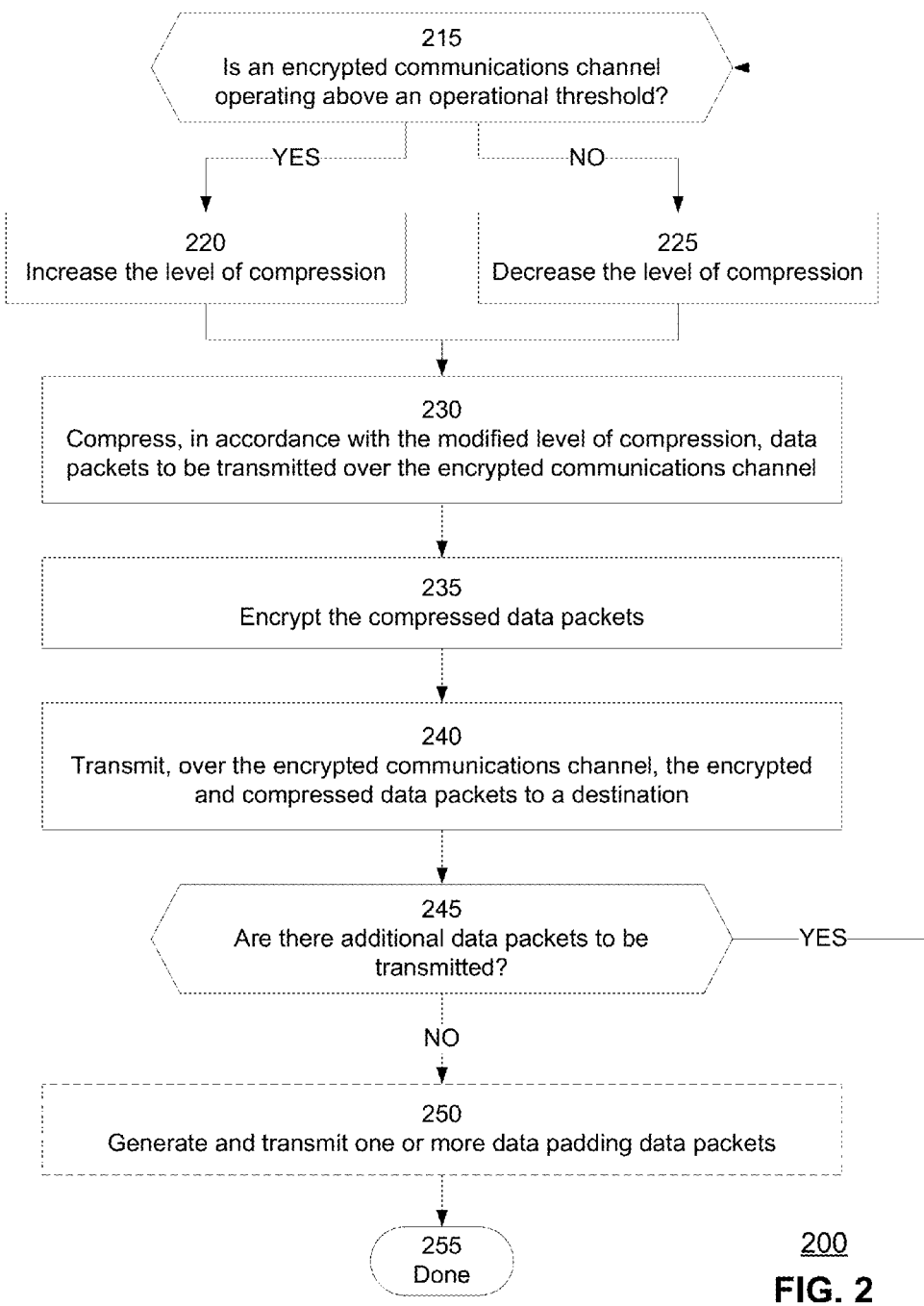
FIG. 2 is a flow chart illustrating an example process for communicating using adaptive data compression, in accordance with various aspects of the subject technology.

FIG. 2 is a flow chart illustrating an example process 200 for communicating using adaptive data compression, in accordance with various aspects of the subject technology. Although the operations in process 200 are shown in a particular order, certain operations may be performed in different orders or at the same time.

When data in the form of data packets are to be transmitted over an encrypted communications channel, a system may be configured to determine whether the encrypted communications channel is operating above an operational threshold for the encrypted communications channel at block 215. The system may determine the operational threshold by calculating or estimating the capacity (or bandwidth) of the communications channel. The capacity for the communications channel may be determined in a number of different ways. For example, the capacity may be determined by estimating an allowable number of bytes per second that the communications channel can support based on the quotient of the current congestion window and the round trip time (RTT). The capacity may also be determined by detecting the spread of packets during their transit across a network.

The operational threshold may be set as a function of the capacity of the communications channel. As an illustrative example, the operational threshold may be equal to the estimated capacity of the communications channel, 0.95 times the estimated capacity, 1.05 times the estimate capacity, or some other function or ratio based on the estimated capacity.

According to various aspects of the subject technology, the system may determine whether the communications channel is operating above the operational threshold before beginning transmission of the data packets. However, in other aspects of the subject technology, the system may be configured to begin transmission of the data packets at a default or initial level of compression before determining whether the communications channel is operating above the operational threshold at block 215. The default or initial level of compression may be, for example, full compression, no compression, half compression, or some other level of compression.

Based on whether the encrypted communications channel is operating above an operational threshold for the encrypted communications channel, the system may select or modify the level of compression used to transmit the data packets. According to various aspects of the subject technology, a number of different operational thresholds may be used (e.g., an operational threshold equal to the estimated capacity of the communications channel, 0.95 times the estimated capacity, 1.05 times the estimate capacity, etc.). A level of compression may be selected depending on which operational threshold or what combination of operational thresholds was exceeded.

According to some aspects of the subject technology, the system may modify the level of compression currently used to transmit the data packets based on whether or not the encrypted communications channel is operating above an operational threshold. For example, if it is determined that the encrypted communications channel is operating above an operational threshold at block 215, the system may increase the level of compression at block 220. An increased level of compression may result in data packets being compressed more, thereby resulting in smaller compressed data packets. If, on the other hand, the encrypted communications channel is not operating above an operational threshold at block 215, the system may decrease the level of compression at block 225. A decreased level of compression may result in data packets being compressed less.

Although in FIG. 2, the system is shown to modify the level of compression used to transmit data packets based on the same operational threshold, different operational thresholds may also be used. For example, according to some aspects of the subject technology, the system may define a target performance range of operation for the encrypted communications channel. The target performance range may be determined in a way so that malicious parties are prevented from being able to determine differences in data packet sizes or identify which data packets correspond to communications induced by the malicious parties, while at the same time preventing latency in the communications channel. The target performance range may be, for example, 0.9 to 0.95 times the capacity of the encrypted communications channel.

Accordingly, the system may increase the level of compression at block 220 if the encrypted communications channel is operating above an operational threshold of 0.9 times the capacity of the communications channel. The system may reduce the level of compression if the encrypted communications channel is operating below an operational threshold of 0.95 times the capacity of the communications channel. If the encrypted communications channel is operating between the two operational thresholds (e.g., between 0.9 and 0.95 times the capacity), the system may maintain the current level of compression.

After the level of compression has been set, the system may compress the data packets to be transmitted over the encrypted communications channel in accordance with the level of compression at block 230. The data packets may be compressed using one or more compression encodings such as, for example, the Huffman encoding or the Lempel-Ziv-Welch (LZW) encoding. The system may vary the amount of compression achieved in compressing the data packets by, for example, increasing or decreasing the efficiency and efficacy of the compression encodings used. According to other aspects of the subject technology, the system may vary the amount of compression achieved by determining a ratio of data packets to be compressed based on the level of compression, identifying a subset of the data packets to be transmitted based on the ratio, and compressing the identified subset of the data packets while the other data packets to be transmitted are not compressed.

According to various aspects of the subject technology, when the communications channel is operating below the operational threshold, in addition to decreasing the level of compression, the system may also pad the data packets before the data packets are transmitted over the encrypted communications channel. For example, the compressed and encrypted data packets may be padded with empty data such that the resulting padded data packets fit precisely into a single fixed-size packet. In some variations, only some data packets (e.g., data packets that contain data frames) may be padded while others are not (e.g., data packets that contain predominantly ACK information).

At block 235, the compressed data packets may be encrypted using one or more cryptographic protocols, such as the secure sockets layer (SSL) protocol or the transport layer security (TLS) protocol, or encryption as provided in the QUIC protocol. After compression and encryption of the data packets, at block 240, the compressed and encrypted data packets may be transmitted over the network 150 (e.g., the encrypted communications channel) to their destination (e.g., a computing machine in the network environment 100). At block 245, the system may determine whether there are additional data packets to be transmitted. If there are additional packets to be transmitted, the process may return to block 215, where the system may determine how the encrypted communications channel is operating with respect to an operational threshold.

If, on the other hand, there are no additional packets to be transmitted, according to some aspects of the subject technology, at block 250, the system may generate one or more padding data packets (e.g., data packets of plain text or other data that represents padding) that will be discarded by the receiver at the destination and transmit the one or more packets. Such data packets may be encrypted and transmitted without any compression.

Accordingly, according to some aspects of the subject technology, adaptive compression of data packets may also include adding data packets and expanding data transmitted over the encrypted communications channel. Such expansion of the data transmission may occur, for example, when the communications channel is operating below an operational threshold or well below the capacity of the communications channel. Although FIG. 2 shows that the padding data packets are generated and transmitted if there are no additional packets to be transmitted, in other aspects, the padding data packets may be created and transmitted to the destination at any other point in the process 200 when the communications channel is operating below an operational threshold.

According to other aspects of the subject technology, however, if there are no additional packets to be transmitted, according to some aspects of the subject technology at block 245, the process may simply finish at block 255.

Figure 3:
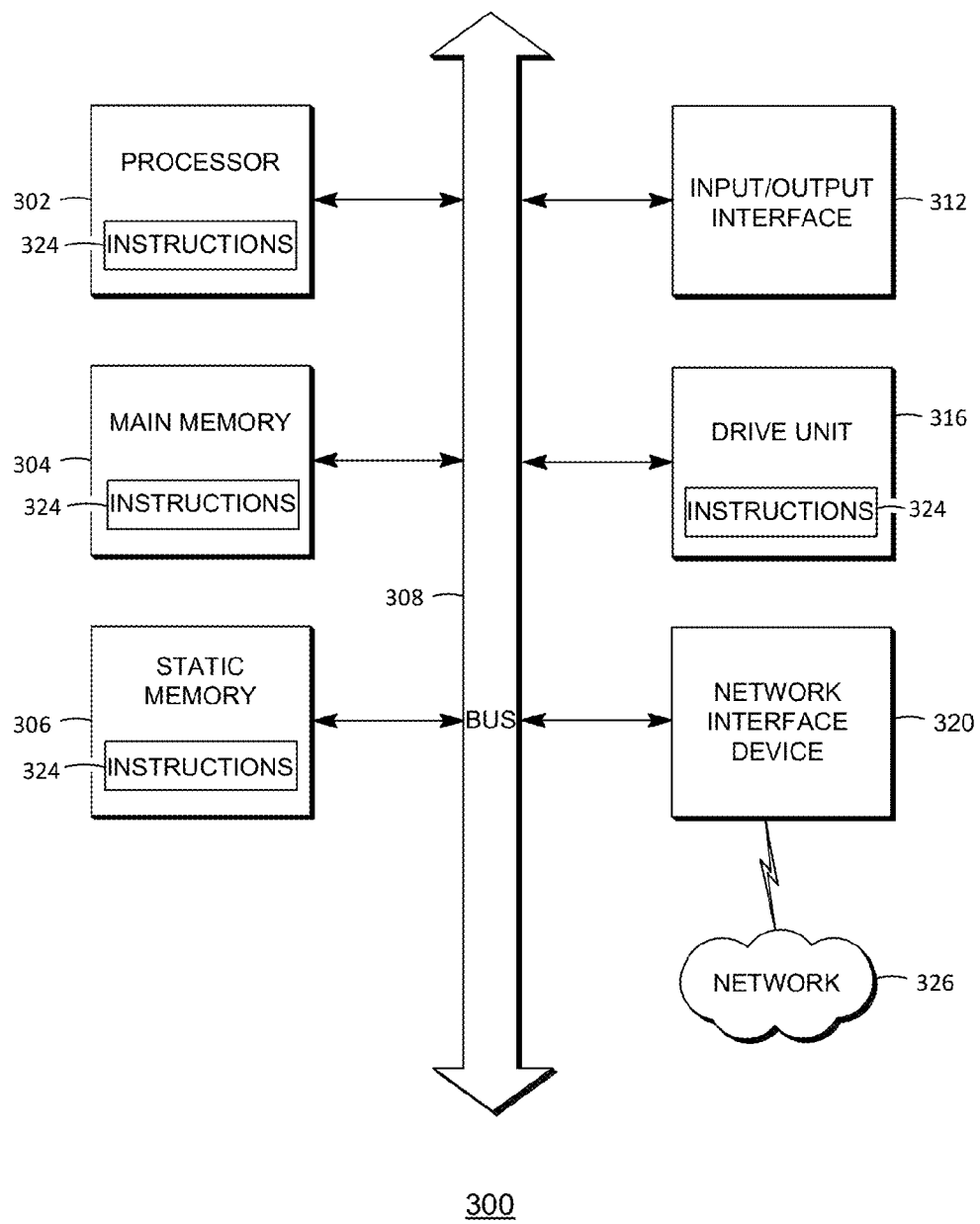
FIG. 3 is a block diagram illustrating a computer system with which any of the client devices and servers of FIG. 1 may be implemented, in accordance with various aspects of the subject technology.

FIG. 3 is a block diagram illustrating a computer system with which any of the clients and servers of FIG. 1 may be implemented, in accordance with various aspects of the subject technology. In certain aspects, the computer system 300 may be implemented using hardware or a combination of software and hardware, either in a dedicated server, or integrated into another entity, or distributed across multiple entities.

The example computer system 300 includes a processor 302, a main memory 304, a static memory 306, a disk drive unit 316, and a network interface device 320 which communicate with each other via a bus 308. The computer system 300 may further include an input/output interface 312 that may be configured to communicate with various input/output devices such as video display units (e.g., liquid crystal (LCD) displays, cathode ray tubes (CRTs), or touch screens), an alphanumeric input device (e.g., a keyboard), a cursor control device (e.g., a mouse), or a signal generation device (e.g., a speaker).

Processor 302 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

A machine-readable medium (also referred to as a computer-readable medium) may store one or more sets of instructions 324 embodying any one or more of the methodologies or functions described herein. The instructions 324 may also reside, completely or at least partially, within the main memory 304 and/or within the processor 302 during execution thereof by the computer system 300, with the main memory 304 and the processor 302 also constituting machine-readable media. The instructions 324 may further be transmitted or received over a network 326 via the network interface device 320.

The machine-readable medium may be a single medium or multiple media (e.g., a centralized or distributed database, and/or associated caches and servers) that store the one or more sets of instructions. The machine-readable medium may include the drive unit 316, the static memory 306, the main memory 304, the processor 302, an external memory connected to the input/output interface 312, or some other memory. The term "machine-readable medium" shall also be taken to include any non-transitory medium that is capable of storing, encoding or carrying a set of instructions for execution by the machine and that cause the machine to perform any one or more of the methodologies of the embodiments discussed herein. The term "machine-readable medium" shall accordingly be taken to include, but not be limited to, storage mediums such as solid-state memories, optical media, and magnetic media.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" may be used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer-implemented method for communicating using adaptive data compression, the method comprising:
    determining whether an encrypted communications channel operating with a level of compression is operating below an operational threshold based on a capacity of the encrypted communications channel;
    decreasing the level of compression when the encrypted communications channel is operating below the operation threshold;
    compressing, in accordance with the level of compression, data packets to be transmitted over the encrypted communications channel;
    creating, when the encrypted communications channel is operating below the operational threshold, at least one padding data packet, wherein the data of the at least one padding data packet comprises padding data;
    encrypting the compressed data packets and the at least one padding data packet;
    transmitting, over the encrypted communications channel, the compressed and encrypted data packets to a destination; and
    transmitting, over the encrypted communications channel, the encrypted at least one padding data packet to the destination.

2. The computer-implemented method of claim 1, further comprising adding, when the encrypted communications channel is operating below the operational threshold, empty data to at least one of the data packets to be transmitted.

3. The computer-implemented method of claim 1, further comprising:
    calculating the capacity of the encrypted communications channel; and
    identifying the operational threshold based on the capacity of the encrypted communications channel.

4. The computer-implemented method of claim 3, wherein the capacity of the encrypted communications channel is calculated based on a current congestion window and a round trip time (RTT) for the encrypted communications channel.

5. The computer-implemented method of claim 1, further comprising transmitting an initial set of data packets at a default level of compression before the determining of whether the encrypted communications channel is operating below an operational threshold.

6. The computer-implemented method of claim 1, wherein the data packets are compressed using at least one of a Huffman encoding or a Lempel-Ziv-Welch (LZW) encoding.

7. The computer-implemented method of claim 1, further comprising identifying a set of data packets to be compressed from the data packets to be transmitted based on the level of compression, wherein compressing the data packets comprises compressing the set of data packets to be compressed.

8. The computer-implemented method of claim 1, wherein the data packets are encrypted using at least one of a secure sockets layer (SSL) protocol or a transport layer security (TLS) protocol.

9. The computer-implemented method of claim 1, further comprising increasing, when the encrypted communications channel is operating above the operational threshold, the level of compression for the encrypted communications channel.

10. A system comprising:
    one or more processors; and
    a machine-readable medium comprising instructions stored therein, which when executed by the one or more processors, cause the one or more processors to perform operations comprising:
        determining whether an encrypted communications channel operating with a level of compression is operating above or below an operational threshold based on a capacity of the encrypted communications channel;

decreasing the level of compression when the encrypted communications channel is operating below the operational threshold;

creating at least one padding data packet when the encrypted communications channel is operating below the operational threshold, wherein data of the at least one padding data packet comprises padding data;

compressing, in accordance with the level of compression, data packets to be transmitted over the encrypted communications channel;

encrypting the compressed data packets and the at least one padding data packet; and transmitting, via a network, the compressed and encrypted data packets and the encrypted at least one padding data packet to a destination.

11. The system of claim 10, further comprising increasing the level of compression when the encrypted communications channel is operating above the operational threshold.

12. The system of claim 10, further comprising adding empty data to at least one of the data packets to be transmitted when the encrypted communications channel is operating below the operational threshold.

13. The system of claim 10, wherein the operations further comprise:

calculating the capacity of the encrypted communications channel; and identifying the operational threshold based on the capacity of the encrypted communications channel.

14. A non-transitory machine-readable medium comprising instructions stored therein, which when executed by a machine, cause the machine to perform operations comprising:

comparing operation of an encrypted communications channel operating with a first level of compression to at least one operational threshold for the encrypted communications channel, wherein the at least one operational threshold is based on a capacity of the encrypted communications channel;

selecting a second level of compression for the encrypted communications channel based on the comparing, wherein the second level of compression is lower than the first level of compression when the encrypted communications channel is operating below the at least one operational threshold;

creating at least one padding data packet when the encrypted communications channel is operating below the at least one operational threshold, wherein data of the at least one padding data packet comprises padding data;

compressing, in accordance with the second level of compression, data packets to be transmitted over the encrypted communications channel;

encrypting the compressed data packets;

encrypting the at least one padding data packet;

transmitting, via a network, the compressed and encrypted data packets to a destination; and transmitting, via the network, the encrypted at least one padding data packet to the destination.

15. The non-transitory machine-readable medium of claim 14, wherein the second level of compression is higher than the first level of compression when the encrypted communications channel is operating above the at least one operational threshold.

16. The non-transitory machine-readable medium of claim 14, wherein the at least one operational threshold comprises a first operational threshold and a second operational threshold, and wherein the second level of compression is equal to the first level of compression when the encrypted communications channel is operating above the first operational threshold and below the second operational threshold.

17. The non-transitory machine-readable medium of claim 14, wherein the operations further comprise:

calculating the capacity of the encrypted communications channel; and identifying the at least one operational threshold based on the capacity of the encrypted communications channel.

* * * * *